Oct. 1, 1968                    H. H. ROSS                    3,404,270
            RADIOACTIVE ISOTOPE-ACTIVATED LIGHT SOURCE
                      FOR COLOR PHOTOMETER
Filed Oct. 23, 1965                                    2 Sheets-Sheet 1

INVENTOR.
Harley H. Ross
BY
ATTORNEY

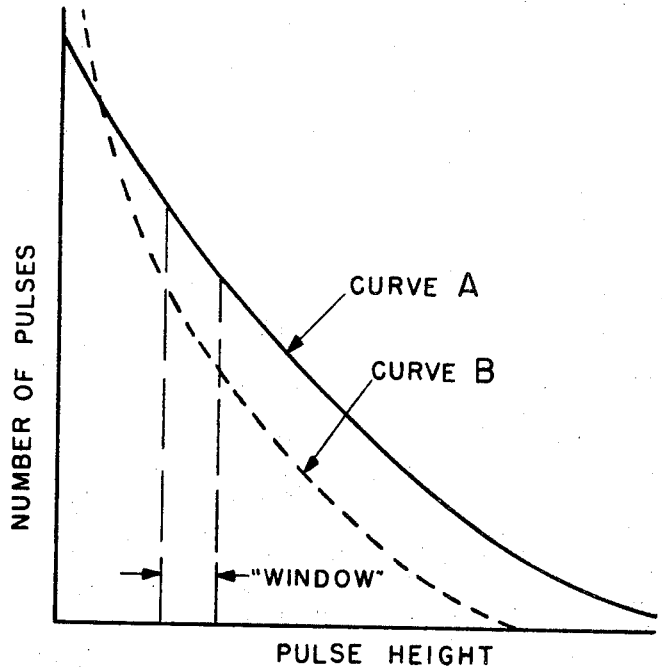
Fig. 3
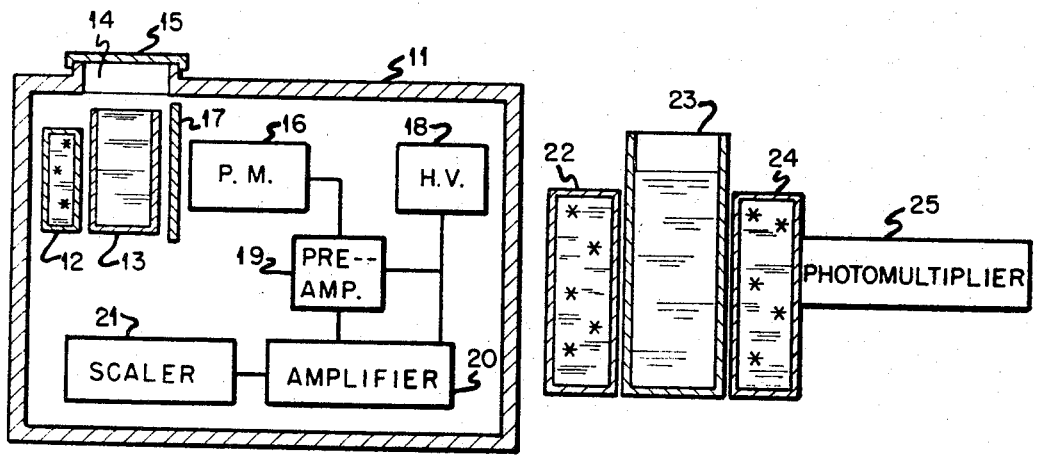
Fig. 4
Fig. 5

3,404,270
**RADIOACTIVE ISOTOPE-ACTIVATED LIGHT
SOURCE FOR COLOR PHOTOMETER**
Harley H. Ross, Oak Ridge, Tenn., assignor to the United
States of America as represented by the United States
Atomic Energy Commission
Filed Oct. 23, 1965, Ser. No. 504,268
5 Claims. (Cl. 250—43.5)

ABSTRACT OF THE DISCLOSURE

A radioactivity-activated scintillator is utilized as a light source for a color photometer for quantitative chemical analysis, whereby illumination is obtained without external power consumption. The output of such a photometer, utilizing the above light source, is digital in nature and the precision obtainable thereby is substantially greater than heretofore possible.

---

The invention described herein was made in the course of, or under, a contract with the U.S. Atomic Energy Commission.

Extensive utilization is made of light absorption as a means of quantitative analysis in the field of analytical chemistry. Although several physical properties of chemical constituents can be utilized for an analysis, absorption of radiant energy as a function of concentration is probably the property most often used for analytical purposes. Many varieties of apparatus are in current use and generically may be called photometers. Within this general class there are subclasses such as filter photometers, spectrophotometers, etc. The differences are primarily in the wavelength region covered, the mode of selection of the wavelength of the light used, and the means for determining the value of the concentration of the specific constituent.

The photometers presently in use have a wide range of complexity. In all, however, there are certain disadvantages which include:

(1) The precision is inherently quite low and unsuitable for the analysis of macro-concentrations of material.

(2) The light source must be carefully controlled.

(3) The light source utilizes a large fraction of the total instrument power requirement.

(4) The output is analog in nature and must be converted to digital form for modern data processing equipment.

Applicant with a knowledge of the problems of the prior art has for an object of his invention the provision of a photometer which reduces or negates these and other disadvantages of photometers of the prior art, the principal goal being to improve the light source in view of the prior demands upon power consumption, intensity control, and the continuous nature of the emission.

Figure 1:
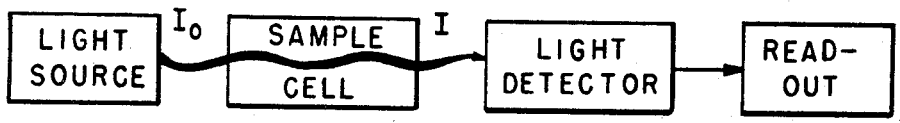
Figure 2:
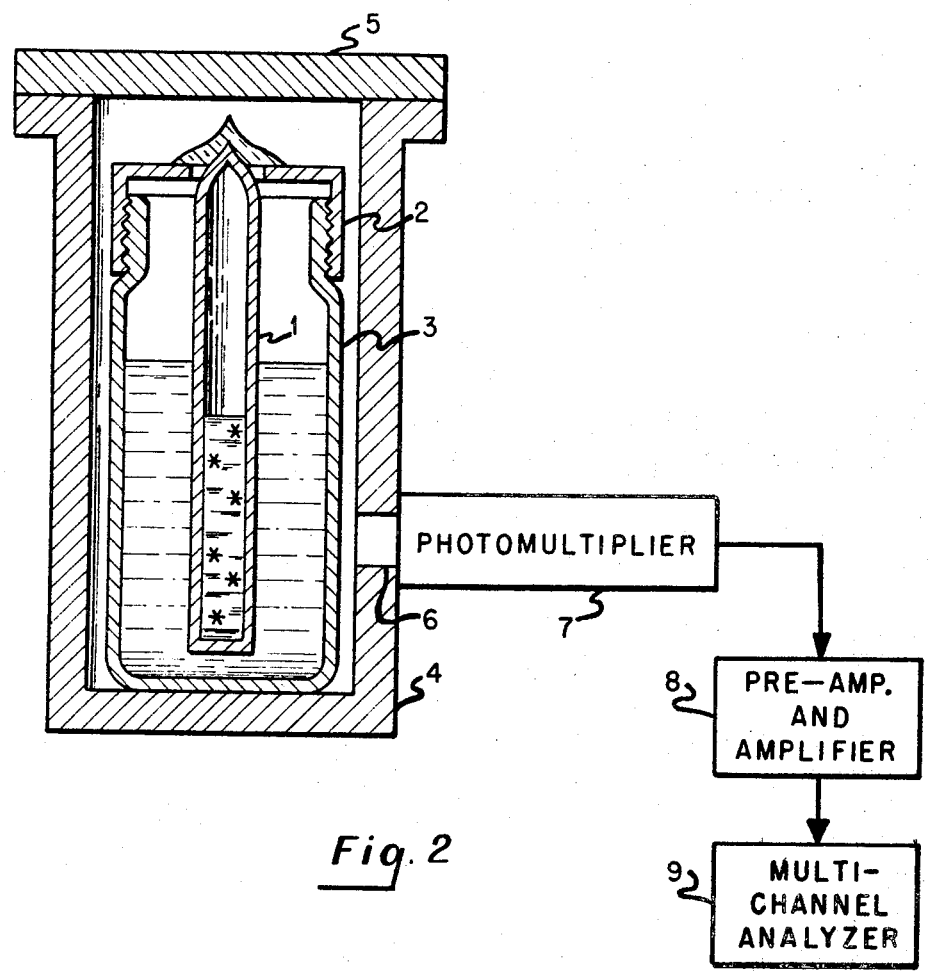

In the drawings, FIG. 1 is a block diagram illustrating the major components of a photometer, FIG. 2 is a drawing illustrating apparatus utilized for demonstrating a photometer designed to accomplish the above-stated object, FIG. 3 is a graph illustrating the response of a multichannel analyzer to the pulses received from the photomultiplier tube of FIG. 2, FIG. 4 is a sketch showing how a commercial photometer of the subject design might be constructed, and FIG. 5 illustrates a modification wherein ultraviolet absorption might be achieved using the subject development.

The basic components of prior art photometers are shown in FIG. 1. Light from a closely controlled source is caused to pass through a sample cell. The intensity of this light, $I_0$, is normally reduced to some value I by adsorption within a sample (normally a liquid) in the cell. The intensity of light after passing through a sample is measured by any convenient means and a "readout" is used to provide an analog signal proportional to the concentration of the constituent of the sample.

With this in mind, the inventor has discovered and developed a photometer wherein the light source comprises a scintillating material activated by a radioisotope. The scintillator may be liquid, gel, solid, etc., and the resultant light source may have any desirable geometric configuration. The radioisotope preferably should be a pure β-emitter having a long half-life. Such a light source then has the following characteristics:

(a) Light *pulses* are produced at a continuous and well-defined rate.

(b) The light pulses have an intensity ranging from zero to some maximum energy as determined by the energy of the emissions from the radioisotope.

(c) The spectral distribution of the light source is a function of the specific scintillator and is independent of the activating radioisotope.

(d) No external power is required.

Since light pulses are emitted, a given band of pulse heights may be monitored in a manner similar to that used in radioactivity counting and results are digital in nature as contrasted to the prior art analog output. This, in turn, permits increased precision if moderate counting times are utilized. Also, the output is amenable with complex data processing equipment and telemetry.

Applicant's improved color photometer is illustrated in FIG. 2 which is a combined cross sectional drawing and block diagram of apparatus employed to demonstrate the operability of a radioactivity-scintillator light source for colorimetry. In this embodiment, a liquid scintillator and the radioactivity are contained in a vial 1 which is cemented so as to depend from the cover 2 of a sample bottle. When inserted into a sample bottle 3, the vial 1 is essentially axially spaced therein. The bottle, in turn, is normally encased by a holder 4 with a removable light-tight cover 5. The holder 4 is provided with a side aperture 6, the axis of which is directed perpendicularly to the axis of the vial 1. A photomultiplier 7 is positioned adjacent aperture 6, in sealed relationship to the holder 4, to monitor the light emitted from the vial 1. The output from the photomultiplier is fed into conventional amplifying circuits 8 and thence into a multichannel analyzer 9. For these initial tests, a liquid scintillator having the following composition was utilized:

|  | G./l. |
|---|---|
| 2,5-diphenyloxazole (PPO) | 7 |
| Dimethyl 1,4-bis-2-(phenyloxazolyl)-benzene (DMPOPOP) | 0.3 |
| Naphthalene | 100 |

Two different radioactive solutions were individually used: $^{14}$C-toluene (∼50 μc. $^{14}$C) and $^{36}$Cl—HCl (∼10 μc. $^{36}$Cl). The spectral distribution of this particular light source ranged from about 350 to 550 millimicrons. The photomultiplier and amplifying circuits were those in a Packard Tri-Carb liquid scintillation spectrometer, and the analyzer was an RCL 256 channel (only 64 channels used). It is emphasized that this apparatus was not selected as being an optimum combination; rather it was used only to illustrate the subject photometer. An actual analysis model would utilize matched components designed to optimize the particular analysis problem. For example, other scintillator materials might be used to achieve a different spectral distribution, other light source configurations might be used and certainly different electronic components (but providing the same function)

would be utilized. Furthermore, the radioactivity need not be intimately mixed with the scintillating material.

The sample bottle was first filled with distilled water and the number of pulses in the 64 channels were determined for reference purposes. The results of this is shown in curve A of FIG. 3. Taking a specific pulse height range, e.g., channels 11 through 15, the summation of the counts in these channels is equivalent to the area under curve A from channel 11 through channel 15 (the "window"). This summation is designated as $r_0$. Thereafter, one of several conventional color stimulators was placed in the sample bottle and the counting was repeated. The results produced data for curve B and the summation of the counts in the same channels was designated as $r$. Then the value of concentration is readily obtained using the equation $$R = \log \frac{r_0}{r} = \alpha b c$$

where $\alpha$ is the absorption constant for the color stimulator, $b$ is the path length through the sample in cm. and $c$ is the concentration of the color species. Several known color stimulators have been evaluated, using water as a standard, and the sensitivity for the ion therein has been determined for a counting period of 5 minutes. These are as follows:

| Color stimulator: | Sensitivity |
|---|---|
| Iron bethaphenantholene (red) | $\mu$g. Fe/ml./R__ 2.73 |
| Iron orthophenantholene (orange) | $\mu$g. Fe/ml./R__ 4.23 |
| Chromate ($Cr_2O_7^=$) (yellow) | $\mu$g. Cr/ml./R__ 160.7 |
| Copper acetate (blue) | mg. Cu/ml./R__ 142 |
| Nickel nitrate (green) | mg. Ni/ml./R__ 38.0 |

The copper and nickel compounds are known to be poor in sensitivity; however, the sensitivity of the iron compounds appear to be of the order of 10 times the sensitivity obtained in conventional colorimeters. Analysis of the accuracy and precision of the above determinations are in progress. For example, the accuracy of the $Cr_2O_7^=$ determination appears to be about 0.6% and the precision about 0.3% at the counting times used. Much higher levels of precision can be obtained by extending the time of measurement.

A colorimeter for routine use probably would have a different structure than that shown in FIG. 2. For example, as shown in FIG. 4, a compact unit would be assembled within a light-tight housing 11. An activated scintillator light source 12 would be positioned so as to contact a sample cell 13 which can be inserted or removed through an opening 14 in housing 11. This opening 14 would normally be closed with cover 15. A photomultiplier tube 16 would be disposed adjacent the sample cell 13 on the side opposite the light source 12. A shutter 17 might be removably disposed between the sample cell 13 and the photomultiplier tube 16 to prevent damage to the latter by light when the cover 15 is removed. Although not shown, a fixed or removable filter might be disposed between the light source 12 and the sample cell 13. The housing 11 would also enclose a high voltage power supply 18, a preamplifier 19, an amplifier 20 and a fast response scaler 21. The scaler 21 would provide a read-out (digital) and a total elapsed time and "live" time indicator. A gain control for the amplifier would be provided as well as controls for upper and lower discriminators in the amplification system so as to adjust the pulse height "window" (see FIG. 3).

There is another possible embodiment of the subject development as illustrated in FIG. 5. It is known that a mixture of some primary solutes and solvents of the liquid scintillator (in this case PPO plus dioxane) emits ultraviolet light when "energized" by the radiation. Thus, if this is mixed with the radioactivity and placed in one cell 22 adjacent a sample cell 23, the ultraviolet light absorption of the sample will reduce the amount of ultraviolet light escaping on the opposite side of the sample. This ultraviolet light would then excite a solution containing the secondary solute (DMPOPOP) and solvent (dioxane) of the liquid scintillator, as contained in cell 24, so as to produce visible light pulses for detection by photomultiplier 25.

There are photomultiplier tubes commercially available that are sensitive to ultraviolet radiation. If such are to be used, the cell 24 and its contents would not be necessary in the ultraviolet light embodiment shown in FIG. 5.

Having thus described my invention, I claim:

1. A light source for producing digital signals for a color photometer comprising a radioactive isotope-activated scintillating material for providing light pulses of random magnitude, and a liquid sample located in close proximity to the scintillating material for attenuating the light pulses passing therethrough, said sample including a color-forming reagent containing the substance to be analyzed.

2. Photometric analytical apparatus comprising an enclosed mixture of a radioisotope and a scintillating medium for providing a radioisotopic ultraviolet light source, a sample holder for receiving a sample and positioned adjacent to said light source, means for converting any ultraviolet light from said source which passes through a sample in said sample holder into visible light, and means for measuring the quantity of said visible light.

3. The apparatus set forth in claim 2, wherein the sample receiving portions of said sample holder substantially surrounds said light source.

4. The apparatus set forth in claim 2, wherein said radioisotope of said mixture comprises a long-life $\beta$-emitting isotope selected from the group $^{36}$Cl and $^{14}$C.

5. The apparatus set forth in claim 2, wherein said scintillating medium includes 2,5-diphenyloxazole plus dioxane, and said means for converting the ultraviolet light passing through said sample into visible light includes dimethyl 1,4-bis-2-(phenyloxazolyl)-benzene plus dioxane.

References Cited

UNITED STATES PATENTS 2,884,529  4/1959  Eggler et al. _____ 250—71.5

ARCHIE R. BORCHELT, *Primary Examiner.*